United States Patent
Zakhor et al.

(10) Patent No.: US 7,003,039 B2
(45) Date of Patent: Feb. 21, 2006

(54) DICTIONARY GENERATION METHOD FOR VIDEO AND IMAGE COMPRESSION

(76) Inventors: Avideh Zakhor, 936 Creston Rd., Berkeley, CA (US) 94708; Philippe Schmid, Grand' Rue 4, 1071 Chexbres (CH)

( * ) Notice: Subject to any disclaimer, the term of this patent is extended or adjusted under 35 U.S.C. 154(b) by 749 days.

(21) Appl. No.: 09/909,140

(22) Filed: Jul. 18, 2001

(65) Prior Publication Data
US 2003/0058943 A1 Mar. 27, 2003

(51) Int. Cl.
*H04N 7/12* (2006.01)
*H04N 11/02* (2006.01)
*G06K 9/46* (2006.01)

(52) U.S. Cl. .......................... 375/240.22; 275/240.16; 382/253

(58) Field of Classification Search ................. 382/253; 375/240.01–240.07, 240.11–240.16, 240.19, 375/240.23, 240.26
See application file for complete search history.

(56) References Cited

U.S. PATENT DOCUMENTS

| | | | | |
|---|---|---|---|---|
| 5,255,342 A | * | 10/1993 | Nitta | 704/200 |
| 5,444,488 A | * | 8/1995 | Goubault et al. | 375/240.14 |
| 5,457,495 A | * | 10/1995 | Hartung | 375/240.14 |
| 5,699,121 A | * | 12/1997 | Zakhor et al. | 375/240.17 |
| 5,764,921 A | | 6/1998 | Banham et al. | |
| 6,754,624 B1 | * | 6/2004 | Choy et al. | 704/233 |
| 2001/0028683 A1 | * | 10/2001 | Bottreau et al. | 375/240.27 |

OTHER PUBLICATIONS

R. Neff, A. Zakhor, and M. Vetterli. "Very low bit rate video coding using matching pursuit", in Visual Communications and Image Processing '94, A.K. Katsaggelos, Ed., Proceedings of the SPIE vol. 2308, 1994 pp. 47–60, USA.

R. Neff and A. Zakhor, "Matching pursuit video coding at very low bit rates", in Proceedings of the IEEE Data Compression Conference, 1995 pp. 411–420, USA.

(Continued)

*Primary Examiner*—Chris Kelley
*Assistant Examiner*—Dave Czekaj
(74) *Attorney, Agent, or Firm*—Franklin Schellenberg (57) ABSTRACT

This invention relates to the creation of dictionary functions for the encoding of video signals using matching pursuit compression techniques. After an initial set of reference dictionary images is chosen, training video sequences are selected, and motion residuals are calculated. High energy portions of the residual images are extracted and stored when they match selection criteria with the reference dictionary. An energy threshold is used to limit the number of video signal "atoms" encoded for each frame, thus avoiding the encoding of noise. A new dictionary is then synthesized from the stored portions of the image residuals and the original reference dictionary. The process can then be repeated using the synthesized dictionary as the new reference dictionary. This achieves low bit rate signals with a higher signal-to-noise ratio than have been previously achieved.

12 Claims, 8 Drawing Sheets

OTHER PUBLICATIONS

R. Neff and A. Zakhor, "Very low bit-rate video coding based on matching pursuits", IEEE Transactions on Circuits and Systems for Video Technology, vol. 7(1). 1997 pp. 158–171, USA.

O. Al-Shaykh, E. Miloslavsky, T. Nomura, R. Neff, and A. Zakhor, "Video compression using matching pursuits", IEEE Transactions on Circuits and Systems for Video Technology vol. 9(1). 1999 pp. 123–143, USA.

R. Neff and A. Zakhor, "Dictionary approximation for matching pursuit video coding", in Proceedings of the International Conference on Image Processing (ICIP) 2000, 2000 pp. 828–831, USA.

Y. Linde, A. Buzo, and R.M. Gray, "An algorithm for vector quantizer design", IEEE Transactions on Communications vol. 28(1), 1980 pp. 84–95, USA.

K. Zegar, J. Vaisey, and A. Gersho, "Globally optimal vector quantizer design by stochastic relaxation", IEEE Transactions on Signal Processing vol. 40(2), 1992 pp. 310–322, USA.

K. Rose, E. Gurewitz, and G.C. Fox "Vector quantization by deterministic annealing", IEEE Transactions on Information Theory vol. 38(4), 1992 pp. 1249–1257, USA.

S. Mallat and Z. Zhang. "Matching pursuits with time-frequency dictionaries", IEEE Transactions on Signal Processing vol. 41(12). 1995 pp. 3397–3415, USA.

O. Al-Shaykh, R. Neff, T. Nomura, and A. Zakhor, "Video Sequence Compression," chapter in The Digital Signal Processing Handbook, edited by V.K. Madisetti and D.B. Williams, CRC/IEEE Press, 1998, pp. 55–1–55–19, USA.

N.B. Karayiannis and P.I. Pai, "Fuzzy algorithms for learning vector quantization", IEEE Transactions on Neural Networks vol. 7(5), 1996 pp. 1196–1211, USA.

B.A. Olshausen and D.J. Field, Emergence of simple cell receptive field properties by learning a sparse code for natural images, Nature vol. 381, 1996, pp. 607–609, UK.

D. Redmill, D.R. Bull, P. Czerepinski, "Video coding using a fast non-separable matching pursuits algorithm", in Proceedings of the ICIP'98 vol. 1, 1998, pp. 769–773, USA.

C. De Vleeschouwer and B. Macq "New dictionaries for matching pursuits video coding", in Proceedings of the ICIP'98 vol. 1, 1998, pp. 764–768, USA.

Y.T. Chou, W.L. Hwang, and C.L. Huang, "Very low bit video coding based on gain shape VQ and matching pursuits", in Proceedings of the ICIP'99, 1999, pp. 76–80, USA.

* cited by examiner

DICTIONARY GENERATION METHOD FOR VIDEO AND IMAGE COMPRESSION

FIELD OF THE INVENTION

This invention relates to the creation of dictionary functions for the encoding of video sequences in matching pursuit video compression systems. More particularly, this invention presents a method for generating a dictionary for encoding video sequences from a set of patterns extracted, or learned from training input video sequences. When the learned dictionary is used to encode video sequences, it produces low bit rate signals with a higher signal-to-noise ratio.

BACKGROUND OF THE INVENTION

Recent developments in computer networks, and the demand for the transmission of video information over the Internet, have inspired many innovations in video signal encoding for compressed transmission. Of the highest priority is the ability to produce a signal at the destination which is the best match to the original as possible, i.e. the one with the largest signal-to-noise ratio and represented by the smallest number of bits.

To this end, several decomposition techniques have been developed and will be known to those skilled in the art. In these techniques, once a particular frame has already been transmitted, the information required to transmit the succeeding frame can be minimized if the new frame is divided into a motion vector signal, characterizing how a set of pixels will translate intact from the first frame to the succeeding frame, and a residual signal, which describes the remaining difference between the two frames. By transmitting only the motion vector and the residual, a certain amount of data compression is achieved.

The residual itself can be transmitted even more efficiently if both ends of the transmission line contain pattern dictionaries, also called libraries, of primitive image elements, or functions. By matching the residual (or portions thereof) to patterns in the dictionary, the receiver (which also contains a copy of the dictionary) can look up the required element when only the identifying code for the dictionary element is transmitted, further reducing the amount of data that needs to be transmitted to reconstruct the image. This is a technique called Matching Pursuit (MP). This was originally applied to the compression of still images, as has been discussed by S. Mallet and Z. Zhang, "Matching pursuits with time-frequency dictionaries", in IEEE Transactions on Signal Processing Vol. 41(12), pp. 3397–3415 (1995), and has been applied to video processing as well, as described by R. Neff, A. Zakhor, and M. Vetterli, "Very low bit rate video coding using matching pursuit", in Proceedings of the SPIE Vol. 2308, pp 47–60 (1994), and A. Zakhor and R. Neff, in U.S. Pat. No. 5,669,121 "Method and Apparatus for Compression of Low Bit Rate Video Signals".

The creation of dictionary functions which are well matched to describe practical video residuals is therefore of paramount importance for high fidelity video transmission. Simple sets, such as Gabor functions, can be used with good results. However, there is a need to provide the best possible image fidelity with the most efficient dictionary, and there is therefore a need to improve on the compression efficiency achieved using the Gabor functions.

SUMMARY OF THE INVENTION

In this invention, we provide a method for creating a dictionary for matching pursuit video encoding not from an abstract set of patterns, but derived (or learned) from a set of training video sequences. In particular, an algorithm similar to those used in vector quantization (VQ) is used to adapt and update an initial trial dictionary to best match the residuals found in the set of training images. We have found that using standard video benchmarks as training signals to synthesize a new dictionary can lead to a general improvement in video signal-to-noise ratios of 0.2–0.7 dB when compared to the results from a simple Gabor set.

Vector quantization is basically a two step iterative procedure where a dictionary of vectors is learned from input vectors by splitting them into partitions according to a minimum distortion measure, and re-computing the dictionary vectors (also called code vectors) as the centroids of the different partitions. This is not a new topic, as can be seen in Y. Linde, A. Buzo, and R. M. Gray, "An algorithm for vector quantizer design", in IEEE Transactions on Communications Vol. 28(1), pp 84–95 (January, 1980).

However, to apply these algorithms to the problem of video compression, the basic algorithms must be adapted. Vector quantization typically divides an image into tiles of fixed pixel sizes, and looks for the best match in the dictionary for each of the tiles. Previously published variations have included stochastic relaxation methods (K. Zegar, J. Vaisey, and A. Gersho, "Globally optimal vector quantizer design by stochastic relaxation", in IEEE Transactions on Signal Processing Vol 40(2), pp 310–322 (1992)), the use of a deterministic annealing approach (K. Rose, E. Gurewitz, and G. C. Fox, "Vector quantization by deterministic annealing", in IEEE Transactions on Information Theory Vol. 38(4) pp 1249–1257, (1992)), and fuzzy sets (N. B. Karayiannis and P. I. Pai, "Fuzzy algorithms for learning vector quantization", in IEEE Transactions on Neural Networks Vol 7(5) pp 1196–1211 (1996)). All have been functional to some degree, but are time consuming and have high computational overhead.

In our invention, we do not use a fixed tiling for coding of residual image pixels, but instead identify sets of pixels for comparison to the dictionary in which both the center of the set of pixels and the dimension can vary. The selection of the portions of the image to be evaluated are based on the measure "energy", present in the image pixels. Our modification to vector quantization also introduces a time-decreasing threshold to decide which partitions should stay in the learning process, and which should be replaced. New partitions are obtained by splitting large partitions into two subsets. We have found this approach to be fast, and leads to near optimal results.

Although we have applied this method to encoding video sequences, the techniques of our invention can also be applied to the compression of still images, and to other compression techniques that use dictionaries but that are not classically defined as matching pursuit compression schemes.

DETAILED DESCRIPTION OF THE INVENTION

Figure 1:
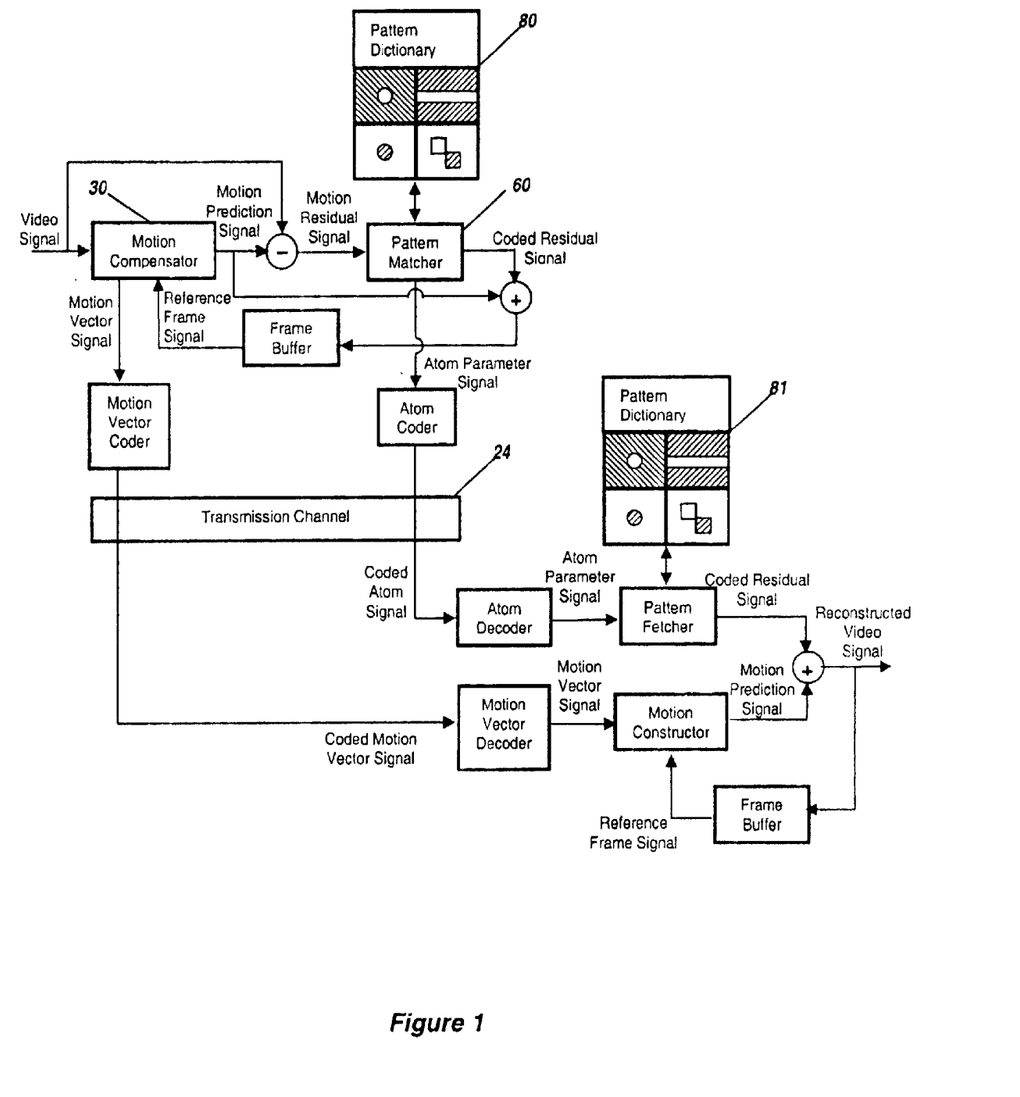
FIG. 1 shows a block diagram of a matching pursuit video system.

This invention relates to the creation of dictionaries for compressing video, and in particular matching pursuit (MP) video encoding systems. An illustration of an MP video compression scheme is shown in FIG. 1. Motion compensation is identified and encoded by the motion compensator 30, and the residual signal is then "matched" by a pattern matcher 60 to one of several functions in the pattern dictionary 80. This residual signal is then coded as an "atom" and sent to the receiver, along with the motion vector, through the transmission channel 24. Upon receipt, the "atom" is decoded and the matched pattern is retrieved from a local copy of the pattern library 81. The final video signal is recreated by recombining the decoded motion vector and the retrieved library pattern.

An example of a dictionary for this kind of video compression system is the set of Gabor functions. These have been described by C. DeVleeschouwer and B. Macq, "New Dictionaries for matching pursuits video coding", in Proceedings of the ICIP '98 (1998) and by R. Neff and A. Zakhor, "Dictionary approximation for patching pursuit video coding", Proceedings of the ICIP 2000 (2000). There are a number of drawbacks to the Gabor functions, however, notably that the heuristics are not systematic, and atoms from Gabor functions tend to introduce small oscillations in the reconstructed signal.

In this invention, we develop a method to generate a dictionary using motion compensated residuals obtained from a set of training sequences, and adapt the learning scheme to the characteristics of matching pursuit. The initial dictionary can be a set of Gabor functions, or other functions derived from other sources.

Figure 2:
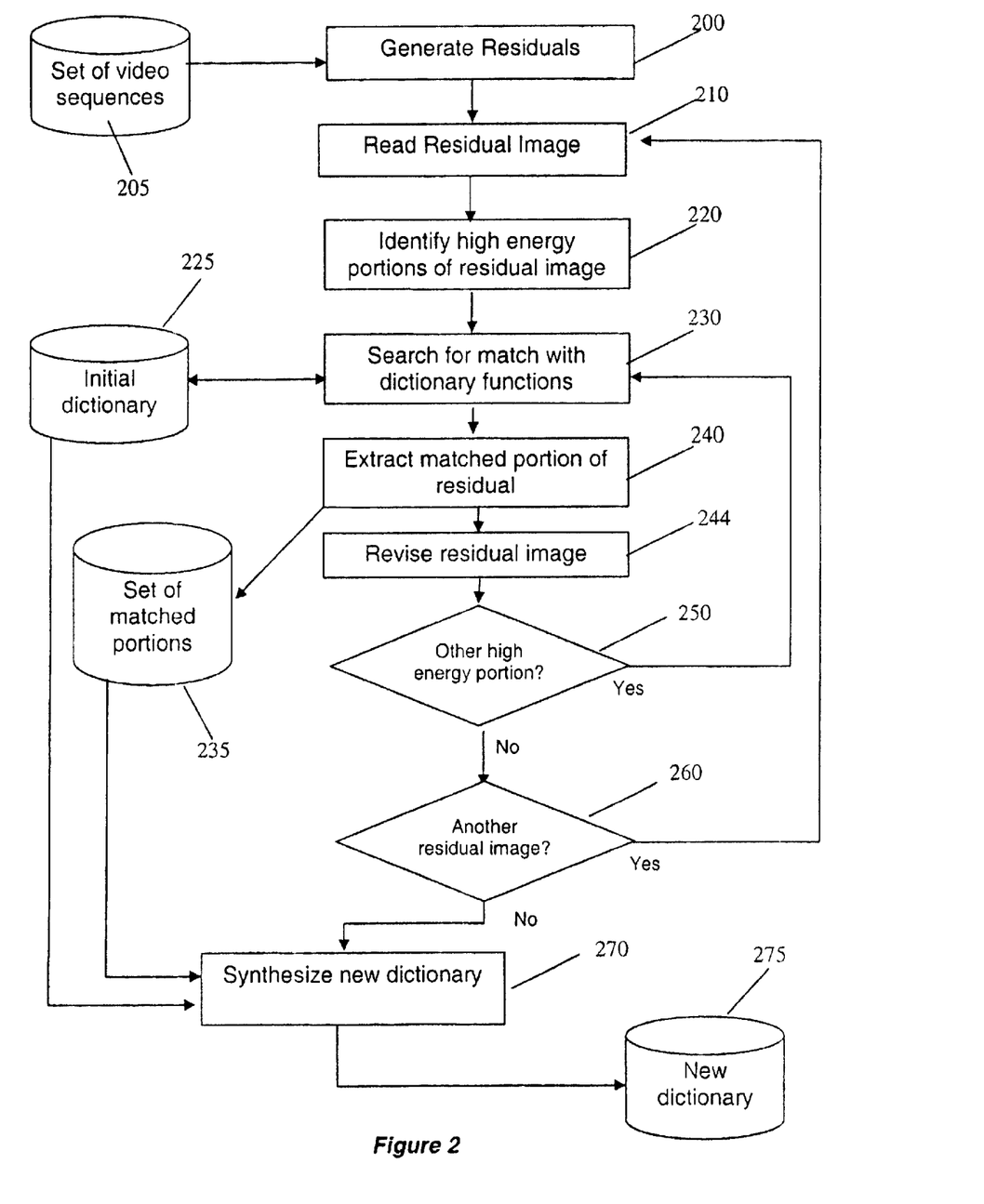
FIG. 2 shows a flow chart of dictionary creation according to the method of the present invention.

The overall sequence of operations is illustrated in FIG. 2. After an initial reference dictionary 225 and a set of training images 205 have been selected, a residual for one of the images is generated in step 200. Step 210 loads the residual image. The high energy portions (i.e. portions where the changes are greater than a predetermined threshold) are identified in step 220. Regions of varying dimension, centered around the high energy portions of the residual are compared to elements in the reference dictionary 225 for the best match in step 230. When a match is found, the next step 240 extracts the matched portion of the residual and a copy of that portion of the residual, called a pattern, is stored as an element in a set of collected patterns 235.

If the extraction process has not automatically removed the high energy residual, step 244 explicitly does so. The remaining portion of the residual is then evaluated in step 250 for other high energy portions, and these again compared to the reference dictionary by repeating steps 230–250 until all high energy portions are matched. Once the selected residual has been exhausted, step 260 tests whether there are other residual images in the training sequence to examine, and if there are steps 210 through 260 are repeated.

Then, the new dictionary 275 is synthesized in step 270 from the initial dictionary 225 and the set of collected patterns 235 using mathematical algorithms updating dictionary code vectors. The process can then be repeated again for further refinement with the new, synthesized dictionary 275 replacing the original reference dictionary 225.

Figure 3:
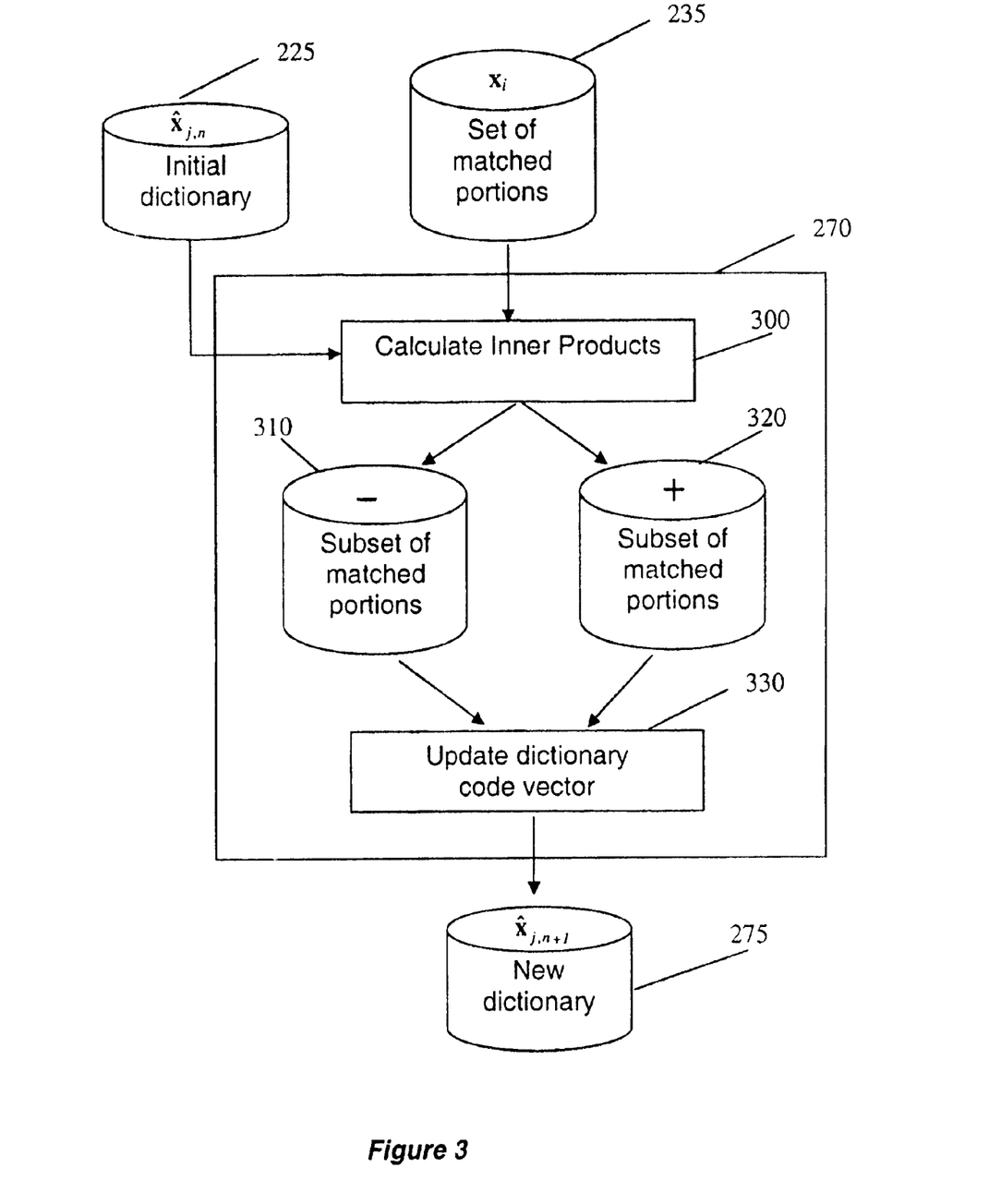
FIG. 3 shows a flow chart of dictionary synthesis according to the method of the present invention.

Details from the synthesizing step are illustrated in FIG. 3. A set of inner products between the collected patterns 235 and the elements of the initial dictionary 225 are calculated in step 300, and the elements of the collected pattern set 235 are divided into two sets, 310 and 320, depending on whether the sign of the inner product is positive or negative. An updated code vector for the new dictionary is then calculated from these two subsets in step 330 using a calculation weighted by the energy of the pattern. The updated code vector is typically normalized and then entered into the new dictionary 275.

In more detail, this learning scheme is similar to algorithms developed for vector quantization (VQ). VQ is an iterative algorithm that learns a given number of vectors, called hereafter code-vectors, from a set of input vectors, also called patterns, according to a pre-defined distortion measure.

Each iteration has two fundamental processing steps:

1. Partition the set of patterns.
2. Update the code-vectors in order to minimize the total distortion in each partition.

The algorithm ends when a predefined stopping criterion, such as a maximum allowed overall distortion, is met.

MP uses the inner product to match the different dictionary functions to the residuals and to select the different atoms used to encode the original signal. We have therefore chosen to use an inner product based distortion measure in our invention, since this metric will later define how well a learned dictionary function matches a residual. Let $S \subset R^k$ be a set of M normalized training patterns of dimension k, $X=\{1, \ldots, N\}$ the set of all code-vector indices, and n the iteration number. The energy $\omega_i$ of the $i^{th}$ pattern is computed before normalization for later use during the code-vector updating step.

We define the following distortion measure between a normalized pattern $x_i \in S$ and the $j^{th}$ normalized code-vector $\hat{x}_{j,n}$:

$$d_{<\cdot,\cdot>}(x_i, \hat{x}_{j,n}) = 1 - |<x_i, \hat{x}_{j,n}>| \qquad [1]$$

where $<\cdot,\cdot>$ is the inner product. The distortion is equal to 1 when $x_i$ and $\hat{x}_{j,n}$ are orthogonal and equal to 0 when they are identical.

A partition $S_{j,n}$ is a set of patterns having minimum distortion with respect to a given code-vector $\hat{x}_{j,n}$:

$$S_{j,n} = \{x_i \in S | d_{<\cdot,\cdot>}(x_i, \hat{x}_{j,n}) \leq d_{<\cdot,\cdot>}(x_i, \hat{x}_{l,n}), \forall l \in X\} \qquad [2]$$

and $$S = \bigcup_{j \in X} S_{j,n} \qquad [3]$$

$$S_{j,n} \cap S_{l,n} = \emptyset \qquad [4]$$

$\forall j \neq l$ and with $j, l \in X$

The updated code-vector $\hat{x}_{j,n} \in R^k$ is obtained by minimizing the total distortion $\delta_{j,n}$ in $S_{j,n}$:

$$\delta_{j,n} \equiv \sum_{x_i \in S_{j,n}} d_{<\cdot,\cdot>}(x_i, \hat{x}_{j,n}) \leq \sum_{x_i \in S_{j,n}} d_{<\cdot,\cdot>}(x_i, x), \forall x \in R^k \qquad [5]$$

Since both $x_i$ and $\hat{x}_{j,n}$ are normalized, the following $L_2$-norm distortion measure can be used instead of Equation [1]:

$$d_{L_2}(x_i, \hat{x}_{j,n}) = \|\hat{x}_{j,n} - x_i\|^2 \qquad [6]$$
$$= (\hat{x}_{j,n} - x_i) \cdot (\hat{x}_{j,n} - x_i)^T$$
$$= 2 - 2\hat{x}_{j,n} \cdot x_i^T$$
$$= 2(1 - \langle x_i, \hat{x}_{j,n} \rangle)$$

provided all inner products are positive.

To achieve this, we let each pattern have two equivalent versions: the original and its negative, i.e. $x_i$ and $-x_i$. This is possible because Equation [1] uses the absolute value of the inner product. We then define $S_{j,n}^{(+)}$ and $S_{j,n}^{(-)}$ as sets of patterns in $S_{j,n}$ having respectively positive and negative inner product with $\hat{x}_{j,n}$:

$$S_{j,n}^{(+)} \cup S_{j,n}^{(-)} = S_{j,n} \qquad [7]$$
$$S_{j,n}^{(+)} \cap S_{j,n}^{(-)} = \emptyset \qquad [8]$$

Once both subsets are computed, we can use equation [6] instead of [1] by taking the negative value of the inner product for each pattern in $S_{j,n}^{(-)}$. Those skilled in the art will realize that Lagrange multipliers can be used for the minimization of equation [5] with the distortion measure defined in Equation [6], and this leads to the following weighted average update equation:

$$\hat{x}_{j,n+1} = \frac{\sum_{x_i \in S_{j,n}^{(+)}} \omega_i x_i}{\sum_{x_i \in S_{j,n}^{(+)}} \omega_i} - \frac{\sum_{x_i \in S_{j,n}^{(-)}} \omega_i x_i}{\sum_{x_i \in S_{j,n}^{(-)}} \omega_i} \qquad [9]$$

This is the algorithm used in the synthesizing step 330 of FIG. 3. More weight is given to high energy patterns in Equation [9] since it is essential to first encode high energy structures present in the motion compensated error. The code-vectors are normalized after being updated.

The algorithm described so far usually converges to a local minimum. In our invention, we put a constraint on the partition size according to a monotonically decreasing function of the iteration number. Partitions smaller than the value given by this function are eliminated. In order to keep the same number of centroids, a randomly selected partition is split into two, with larger partitions being more likely to be selected than smaller ones. The following exponential threshold function is used in our simulations:

$$\Omega_{thresh} = \frac{\Omega}{N} \exp\left\{-\frac{M}{M_0}\right\} \qquad [10]$$

where M is the iteration number, $M_0$ is a constant scalar that controls the time necessary to converge to the final solution, N is the number of code-vectors, and $$\Omega = \sum_{i=1}^{n} \omega_i \qquad [11]$$

is the weighted size of the pattern space.

Figure 4:
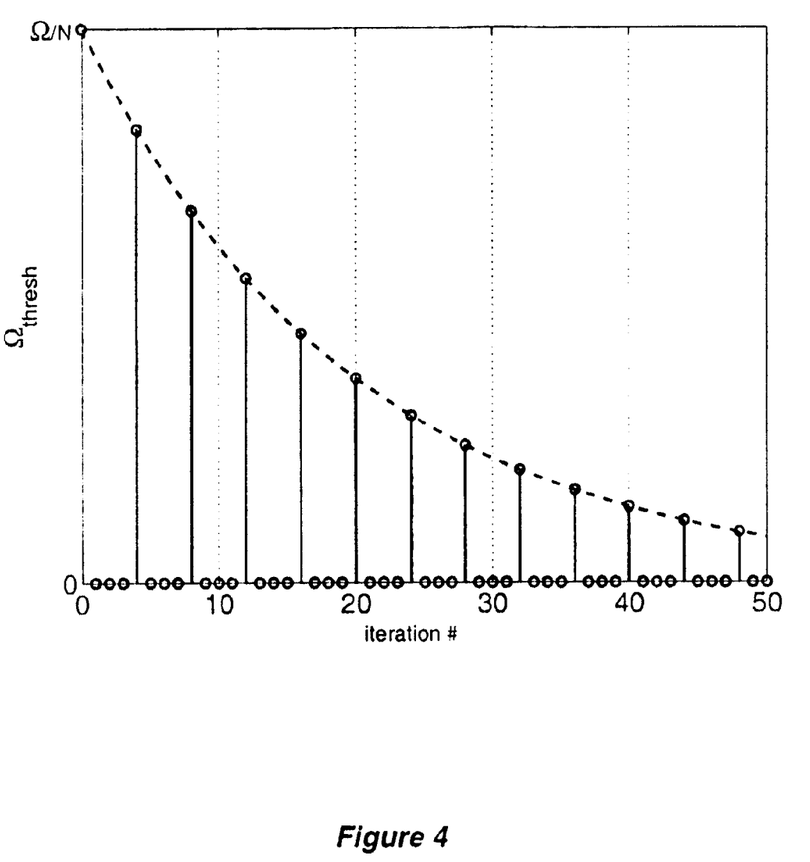
FIG. 4 illustrates variation in the partition size relaxation function used in one embodiment of the invention.

In this invention, $\Omega$ need not be used in every iteration, and it can be beneficial to set the value of $\Omega$ to 0 for many of the iteration steps. We have typically used the total number of iterations M to be 20, and use a non zero value for $\Omega$ in every fourth iteration. This is illustrated in FIG. 4. While this approach is of low complexity, it has shown to be robust, and to lead to near-optimal results.

The extraction of training patterns from the motion residuals is an important aspect of the invention. The entire residual cannot be learned by our system since the high energy content is sparsely distributed. Only regions in the residual where one or several dictionary functions are matched are taken into account. These regions are typically designated to be square with varying dimensions that encompass the entire high energy region, but other dimensions could be used as well. The patterns used to learn new functions are extracted from a set of training sequences encoded with an initial reference dictionary. One example of a set that can be used for the reference dictionary is the set of Gabor functions. Each time a high energy portion of a residual image is matched to a dictionary function, the underlying pattern is extracted. A square window with a fixed size, centered on the matched region, can be used, although windows of other geometries will be apparent to those skilled in the art. Using this approach, only high energy regions of the residual are separated to become patterns used for the training.

Finally, once a new dictionary has been learned, the training sequences are encoded with this new dictionary in order to produce usage statistics. These statistics are then used to compute the Huffman codes necessary to encode the atom parameters for the test sequences.

DESCRIPTION OF A REDUCTION TO PRACTICE

We have implemented software written in ANSI C on a Silicon Graphics Onyx computer to test and demonstrate the capabilities of this invention. To begin, a dictionary must be chosen as an initial reference dictionary. We chose the dictionary h30, as previously described by R. Neff and A. Zakhor, in "Dictionary approximation for matching pursuits video coding", published in the *Proceedings of the ICIP 2000*. This dictionary contains 400 separable Gabor functions and 72 non-separable Gabor functions. The number of functions learned in our simulations is therefore always 472.

Three dictionaries are learned, each one supporting a different number of pixels. The regions of support in this case were chosen to be 9×9, 17×17, and 35×35. In order to obtain a large training set, we collected 17 high motion video sequences of 30 frames each from outside the standard MPEG sequences. Many short sequences were used to allow as many different sequences as possible to be part of the training set while maintaining the total number of training patterns at a reasonable level, in our case around 120,000. The MPEG sequences are kept for the test phase, because they can be easily compared to other techniques for which simulation results are available in the literature.

We also apply a threshold to the energy of the residual to control the bit-rate during learning. The threshold is set empirically, in order to match as precisely as possible the bit-rates suggested for the different MPEG sequences and avoid encoding noise for low energy regions. Finally, usage statistics are used to reduce the size of the learned dictionary from 3×472=1416 down to 472, the number of patterns in the initial dictionary.

Figure 5:
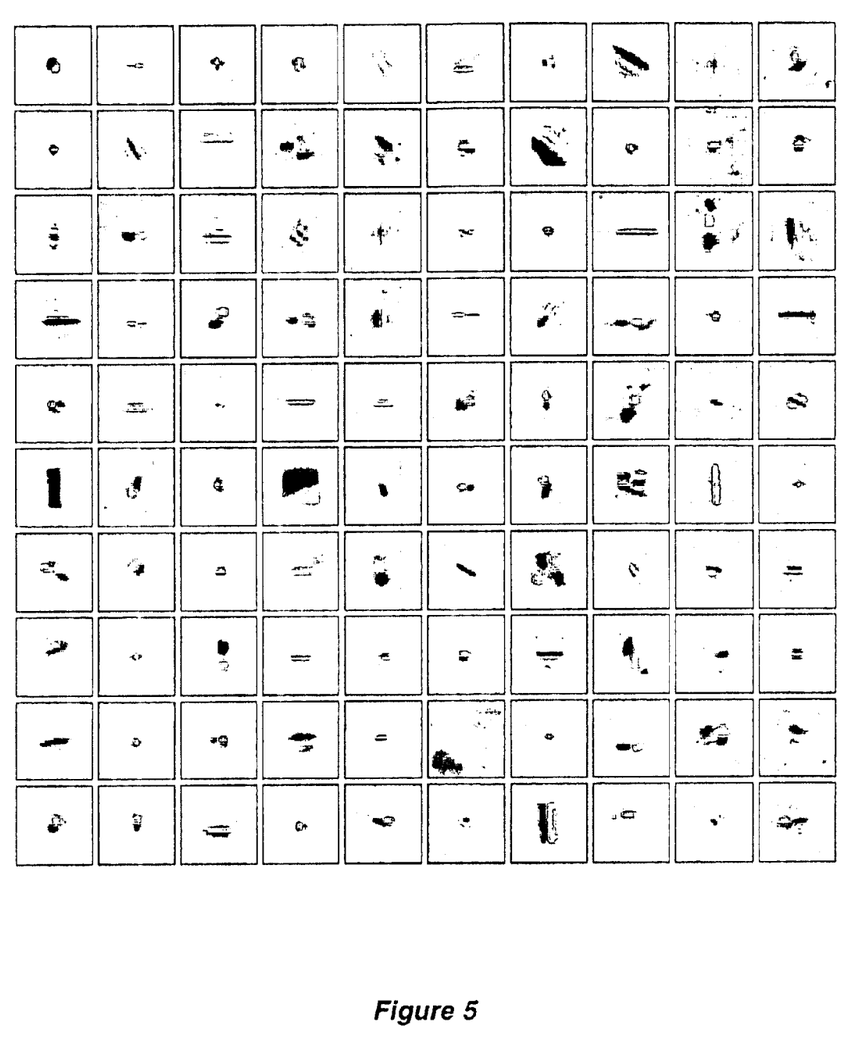
FIG. 5 shows a representation of a portion of the functions in the learned dictionary generated according to one embodiment of the invention.

A subset of the learned dictionary is shown in FIG. 5. After statistical pruning, it contains 116 functions from the 35×35 dictionary (24.47%), 169 functions from the 17×17 dictionary (35.65%), and 189 functions from the 9×9 dictionary (39.88%). Most of these functions have therefore a small region of support. In general, they are well centered, oriented, limited in size, and modulated. We therefore expect that the learned functions can be easily and efficiently approximated with functions of low complexity for fast implementation. The fact that the learned functions have a coherent structure is a very good result, given that learning schemes providing functions of such a "quality" are difficult to establish, in computer vision applications in general.

Figure 6:
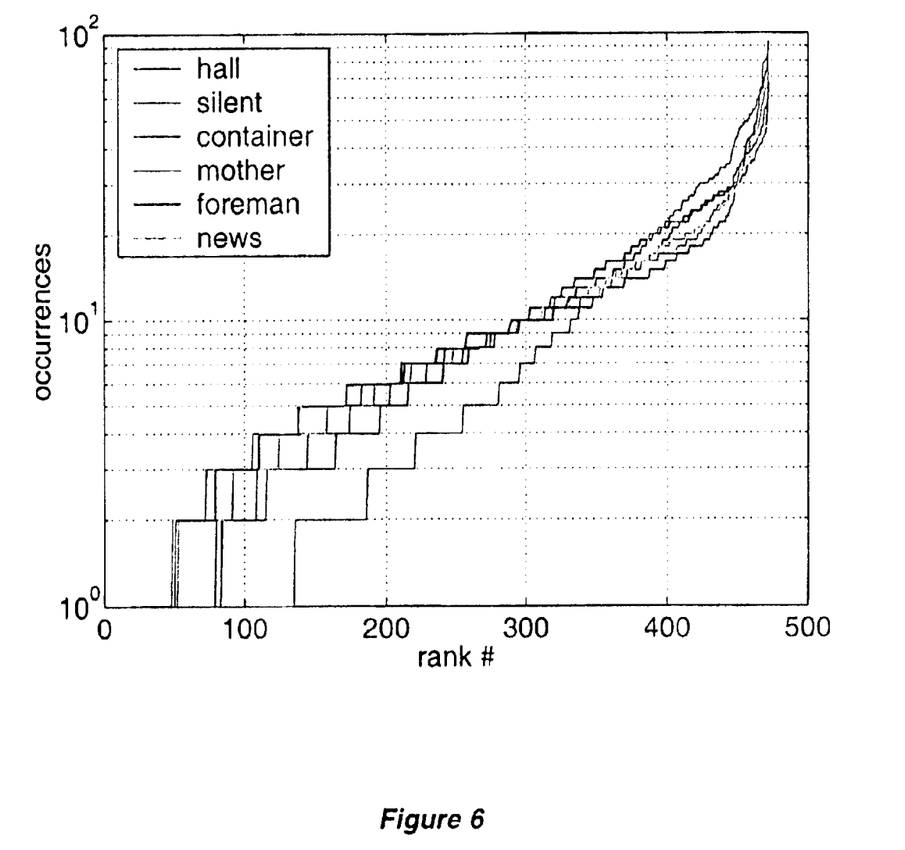
FIG. 6 illustrates the ranked usage of the Gabor functions in matching pursuit video encoding.
Figure 7:
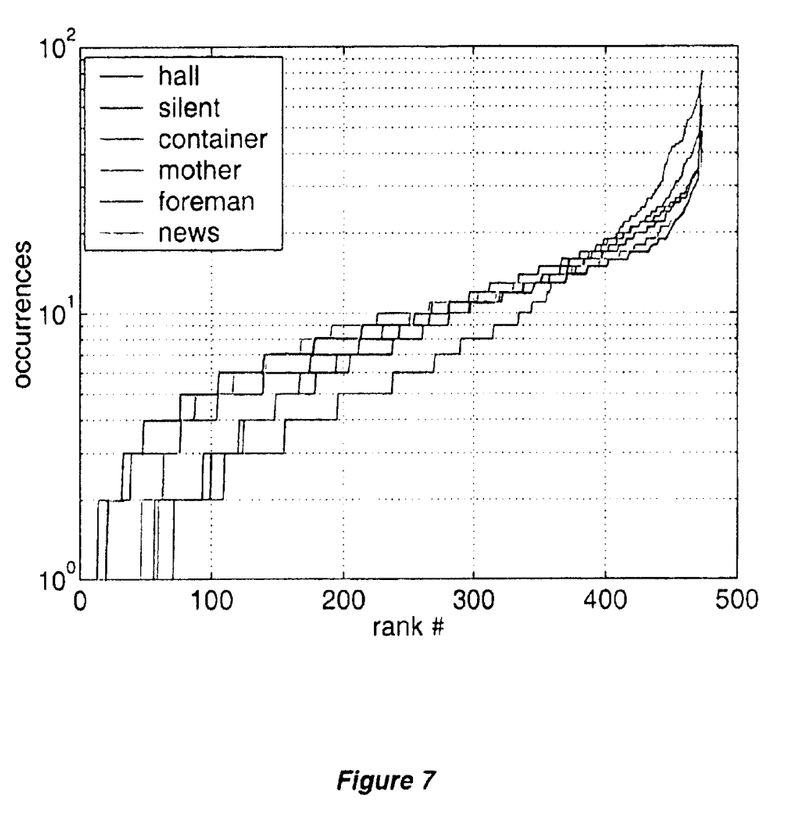
FIG. 7 illustrates the ranked usage of the learned dictionaries of one embodiment of this invention in matching pursuit video encoding.

The ranked usage statistics of all functions in h30 and in the learned dictionary are plotted in FIG. 6 and FIG. 7. These distributions show that the learned dictionary gives almost equal importance to all functions. In that sense, our learning scheme is very efficient.

Figure 8:
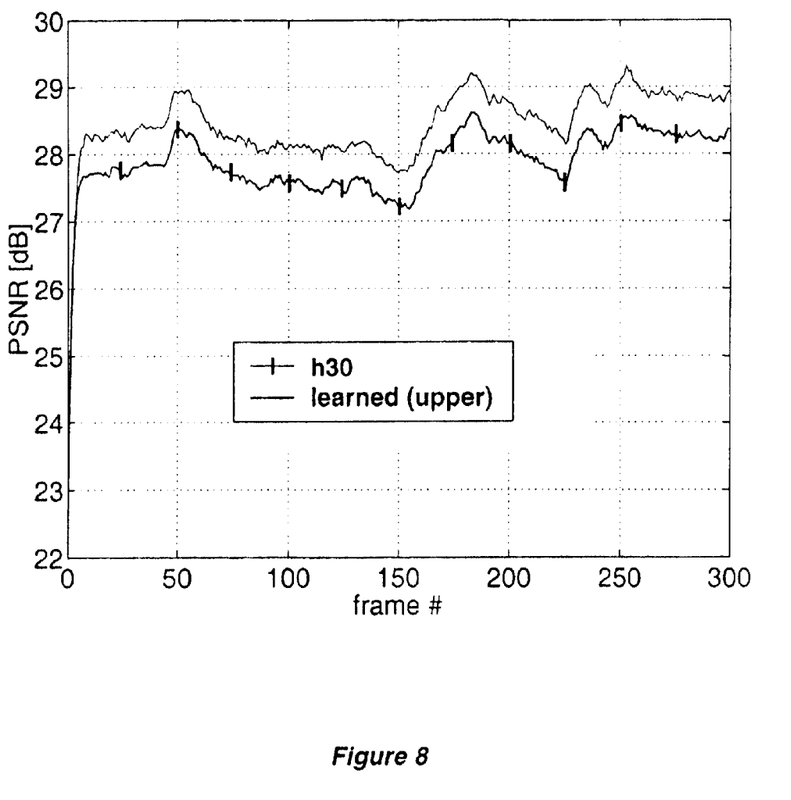
FIG. 8 illustrates the signal to noise ratio for encoding the test sequence Mobile for a learned dictionary according to one embodiment of the invention and for the use of a Gabor set.

The learned dictionary is evaluated with 6 QCIF test sequences: *Foreman, Coast, Table tennis, Container, Mobile, and Stefan*. In all simulations, in order to guarantee similar bit-rate between h30 and our newly designed dictionary, we use the bit trace corresponding to h30 runs to control the bit-rate of our designed dictionary, even though this could potentially lower its performance. A PSNR plot for the sequence Mobile is shown in FIG. 8, and the performance results are summarized in TABLE I. These results show that learning new dictionaries improves PSNR performances especially at higher bit-rates, since at low bit-rates most of the bit budget is spent on the motion vectors.

TABLE I

Signal to noise ratios for 6 test sequences, using h30 and dictionaries according to the present invention.
In all cases, an improved SNR is achieved.

| Sequence | kbps | fps | PSNR with h30 [dB] | PSNR with new dictionary [dB] | Gain [dB] |
|---|---|---|---|---|---|
| Foreman | 112.6 | 30 | 33.05 | 33.49 | 0.44 |
| Foreman | 62.5 | 10 | 32.89 | 33.07 | 0.18 |
| Coast | 156.0 | 30 | 32.11 | 32.59 | 0.48 |
| Coast | 81.5 | 10 | 31.94 | 32.19 | 0.25 |
| Table tennis | 59.5 | 30 | 33.28 | 33.55 | 0.27 |
| Table tennis | 47.6 | 10 | 22.16 | 33.27 | 0.11 |
| Container | 35.2 | 30 | 33.38 | 33.8 | 0.42 |
| Container | 17.3 | 10 | 33.22 | 33.46 | 0.24 |
| Mobile | 313.3 | 30 | 27.87 | 28.53 | 0.66 |
| Stefan | 313.3 | 30 | 29.74 | 30.3 | 0.56 |

The time required to run a complete set of learning simulations is around 4 days on a Silicon Graphics Onyx computer. The reasons are (a) the large number of patterns extracted from the training sequences for the learning phase, i.e. around 120,000 patterns of size 35×35, (b) the successive training cycles necessary to prune the original dictionary from 1416 to 472 functions, and (c) the computation of the Huffman codes for the different atom parameters, such as position, amplitude, and label. The test phase requires additional computation time as well. It is expected that these run times can be reduced by further tuning of the algorithms and optimization of the software.

This presents one of many examples of a reduction to practice for the invention, but its presentation here is not meant to imply that this is the only or even the optimal result that can be eventually achieved using this invention. Possible variations would be to design dictionaries for different classes of video sequences such as animations, high motion sports, head and shoulders, and so forth, using sequences from those individual classes. We expect that improvements can be made in the approximation of the dictionary functions that leads to an efficient implementation as well.

The previous descriptions of the invention and specific embodiments are presented for illustration purposes only, and are not intended to be limiting. Modifications and changes may be apparent and obvious to those skilled in the art, and it is intended that this invention be limited only by the scope of the appended claims.

We claim:

1. A method for creating a dictionary for video compression, comprising
   (a) designating an initial reference dictionary of functions,
   (b) designating a set of video sequences to be used as training sequences,
   (c) calculating the motion residual image for at least one of the frames of a video sequence from the set of video sequences,
   (d) determining an energy threshold for evaluating the residual image,
   (e) evaluating the residual image for portions above the energy threshold
   (f) comparing a first high energy portion of the residual image to at least one function in the reference dictionary,
   (g) extracting the first high energy portion of the residual image,
   (i) storing the extracted high energy portion of the residual image,
   (j) synthesizing the dictionary from the stored high energy portion of the residual image, in which the step of synthesizing comprises dividing the extracted high energy portions into at least two subsets based on an inner product calculation, and
   calculating an updated dictionary pattern from the elements in the two subsets.

2. The method of claim 1, in which the step of calculating comprises $$\hat{x}_{j,n+1} = \frac{\sum_{x_i \in S_{j,n}^{(+)}} \omega_i x_i}{\sum_{x_i \in S_{j,n}^{(+)}} \omega_i} - \frac{\sum_{x_i \in S_{j,n}^{(-)}} \omega_i x_i}{\sum_{x_i \in S_{j,n}^{(-)}} \omega_i}$$

3. The method of claim 1, further comprising the steps of
   (k) revising the residual image, and
   (l) repeating steps (f)–(i) for at least a second high energy portion of the residual image, after said first high energy portion has been extracted.

4. A dictionary for use in video compression, said dictionary generated by
   (a) designating an initial reference dictionary of functions,
   (b) designating a set of video sequences to be used as training sequences,
   (c) calculating the motion residual image for at least one of the frames of a video sequence from the set of video sequences,
   (d) determining an energy threshold for evaluating the residual image,
   (e) evaluating the residual image for portions above the energy threshold
   (f) comparing a first high energy portion of the residual image to at least one function in the reference dictionary,
   (g) extracting the first high energy portion of the residual image,
   (i) storing the extracted high energy portion of the residual image, (j) synthesis from the stored high energy portion of the residual image, in which the step of synthesis comprises dividing the extracted high energy portions into at least two subsets based on an inner product calculation, and calculating an updated dictionary pattern from the elements in the two subsets.

5. The method of claim 4, in which the step of calculating comprises $$\hat{x}_{j,n+1} = \frac{\sum_{x_i \in S_{j,n}^{(+)}} \omega_i x_i}{\sum_{x_i \in S_{j,n}^{(+)}} \omega_i} - \frac{\sum_{x_i \in S_{j,n}^{(-)}} \omega_i x_i}{\sum_{x_i \in S_{j,n}^{(-)}} \omega_i}$$

6. The method of claim 4, further comprising the steps of
(k) revising the residual image, and
(l) repeating steps (f)–(i) for at least a second high energy portion of the residual image, after said first high energy portion has been extracted.

7. A video encoding system containing a dictionary generated by
(a) designating an initial reference dictionary of functions,
(b) designating a set of video sequences to be used as training sequences,
(c) calculating the motion residual image for at least one of the frames of a video sequence from the set of video sequences,
(d) determining an energy threshold for evaluating the residual image,
(e) evaluating the residual image for portions above the energy threshold
(f) comparing a first high energy portion of the residual image to at least one function in the reference dictionary,
(g) extracting the first high energy portion of the residual image,
(i) storing the extracted high energy portion of the residual image,
(j) synthesis from the stored high energy portion of the residual image, in which the step of synthesis comprises dividing the extracted high energy portions into at least two subsets based on an inner product calculation, and calculating an updated dictionary pattern from the elements in the two subsets.

8. The method of claim 7, in which the step of calculating comprises $$\hat{x}_{j,n+1} = \frac{\sum_{x_i \in S_{j,n}^{(+)}} \omega_i x_i}{\sum_{x_i \in S_{j,n}^{(+)}} \omega_i} - \frac{\sum_{x_i \in S_{j,n}^{(-)}} \omega_i x_i}{\sum_{x_i \in S_{j,n}^{(-)}} \omega_i}$$

9. The method of claim 7, further comprising the steps of
(k) revising the residual image, and
(l) repeating steps (f)–(i) for at least a second high energy portion of the residual image, after said first high energy portion has been extracted.

10. A machine readable medium, upon which are stored instructions to generate a dictionary for video compression according to the method comprising steps of
(a) designating an initial reference dictionary of functions,
(b) designating a set of video sequences to be used as training sequences,
(c) calculating the motion residual image for at least one of the frames of a video sequence from the set of video sequences,
(d) determining an energy threshold for evaluating the residual image,
(e) evaluating the residual image for portions above the energy threshold
(f) comparing a first high energy portion of the residual image to at least one function in the reference dictionary,
(g) extracting the first high energy portion of the residual image,
(i) storing the extracted high energy portion of the residual image,
(j) synthesis from the stored high energy portion of the residual image, in which the step of synthesis comprises dividing the extracted high energy portions into at least two subsets based on an inner product calculation, and calculating an updated dictionary pattern from the elements in the two subsets.

11. The method of claim 10, in which the step of calculating comprises $$\hat{x}_{j,n+1} = \frac{\sum_{x_i \in S_{j,n}^{(+)}} \omega_i x_i}{\sum_{x_i \in S_{j,n}^{(+)}} \omega_i} - \frac{\sum_{x_i \in S_{j,n}^{(-)}} \omega_i x_i}{\sum_{x_i \in S_{j,n}^{(-)}} \omega_i}$$

12. The method of claim 10, further comprising the steps of
(k) revising the residual image, and
(l) repeating steps (f)–(i) for at least a second high energy portion of the residual image, after said first high energy portion has been extracted.

* * * * *